(12) United States Patent
Madan et al.

(10) Patent No.: US 6,778,980 B1
(45) Date of Patent: Aug. 17, 2004

(54) TECHNIQUES FOR IMPROVED SEARCHING OF ELECTRONICALLY STORED INFORMATION

(75) Inventors: Umesh Madan, Bellevue, WA (US); Geary Eppley, Sammamish, WA (US)

(73) Assignee: Drugstore.com, Bellevue, WA (US)

( * ) Notice: Subject to any disclaimer, the term of this patent is extended or adjusted under 35 U.S.C. 154(b) by 79 days.

(21) Appl. No.: 09/966,850

(22) Filed: Sep. 27, 2001

Related U.S. Application Data

(60) Provisional application No. 60/271,068, filed on Feb. 22, 2001.

(51) Int. Cl.[7] .............................................. G06F 17/30
(52) U.S. Cl. ..................... 707/3; 707/2; 707/5; 707/101
(58) Field of Search ............................. 707/2, 3, 5, 101

(56) References Cited

U.S. PATENT DOCUMENTS

| | | | | |
|---|---|---|---|---|
| 5,542,090 A | * | 7/1996 | Henderson et al. ............ 707/2 |
| 5,943,670 A | * | 8/1999 | Prager ............................. 707/5 |
| 6,247,015 B1 | * | 6/2001 | Baumgartner et al. ...... 707/101 |
| 6,411,952 B1 | * | 6/2002 | Bharat et al. .................. 707/5 |
| 6,523,026 B1 | * | 2/2003 | Gillis ............................. 707/3 |

\* cited by examiner

*Primary Examiner*—Charles Rones
(74) *Attorney, Agent, or Firm*—Blakely, Sokoloff, Taylor & Zafman LLP

(57) ABSTRACT

Methods and apparatuses for searching electronically-stored information are described. Specifically, in a network providing for electronic commerce, a computer system provides a user with access to a set of electronic commerce pages, category pages and databases for locating products electronically. To locate products electronically, the user performs a search using multiple words. Different forms of the words in the search request are used to generate search hits, and hit vectors containing bits corresponding to the words comprising each search hit are used to indicate the search hits.

32 Claims, 4 Drawing Sheets

TECHNIQUES FOR IMPROVED SEARCHING OF ELECTRONICALLY STORED INFORMATION

This U.S. Patent application claims the benefit of U.S. Provisional Application No. 60/271,068, filed Feb. 22, 2001.

FIELD OF THE INVENTION

The invention relates to electronic information searching techniques. More particularly, the invention relates to a technique for providing improved search results for search requests related to electronically stored information.

BACKGROUND OF THE INVENTION

Huge quantities of information are available via the World Wide Web. For example, electronic commerce Web sites can offer for sale hundreds of products. Educational Web sites can offer access to the equivalent of thousands of printed volumes of information. To use these huge quantities of information, many Web sites provide search engines.

Typical search engines provide a user the ability to perform basic Boolean searches. For example, a user can type a string for which to search (a "search string") and/or search terms connected by logical AND and/or logical OR operators. Searching for a string yields no results, or "hits," if the string does not match exactly.. Use of an AND operator provides more accurate hits, but may miss the desired item if the wrong term is entered. Use of an OR operator provides a greater number of hits, but may result in an overwhelming number of hits.

For example, on a health/pharmacy electronic commerce Web site, a potential customer may search for "Acme Mint Mouthwash," which the user believes to be available. However, this search string does not accurately describe a product because Acme does not manufacture a mint mouthwash. In this example, the string search and an AND search (e.g., Acme AND Mint AND Mouthwash) would yield the same results, i.e., zero hits. If the electronic commerce Web site indicates zero hits, even though Acme may make many other types of mouthwash and other manufacturers provide several mint mouthwashes, potential sales can be lost.

To compensate for the zero hits resulting from the AND search, the electronic commerce Web site can provide or perform an OR search. If the search performed is an OR search, (e.g., Acme OR Mint OR Mouthwash), a large number of hits may result. The number of hits can be so large as to overwhelm the potential customer, which can result in the loss of potential sales. What is needed is an improved search engine.

SUMMARY OF THE INVENTION

A method of electronically searching for information is described. The method involves a user using multiple search terms to perform a search. Different forms of the selected search terms are then used to perform the search, and a hit vector is generated for each response to the search request. Finally, the search results are sent to the user, with the hit vectors forming the basis, in part, for generating the results.

BRIEF DESCRIPTION OF THE DRAWINGS

The invention is illustrated by way of example, and not by way of-limitation, in the figures of the accompanying drawings in which like reference numerals refer to similar elements.

DETAILED DESCRIPTION

Methods and apparatuses for searching electronically stored information are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides methods and apparatuses for searching electronically-stored information. Specifically, in a network providing for electronic commerce, a computer system provides a user with access to a set of electronic commerce pages, category pages and databases for locating products electronically. To locate products electronically, the user performs a search request using multiple words. Different forms of the search terms in the search request are used to generate search hits, and hit vectors are used to indicate the search hits. Each hit vector contains bits corresponding to the search terms comprising the search hit. For example, if a search request with three search terms generates a search hit containing forms of the first and third search terms, the hit vector is 00000101. The third bit from the right represents the first search term in the search request, the next bit to the right represents the second search term in the search request, and the right-most bit represents the last search term in the search request. In addition, the bits set to "1" indicate that the search hit contains the first and third search terms, or forms of those search terms, while the bit representing the second search term being set to "0" indicates that the search hit did not contain any form of the second search term.

Figure 1:
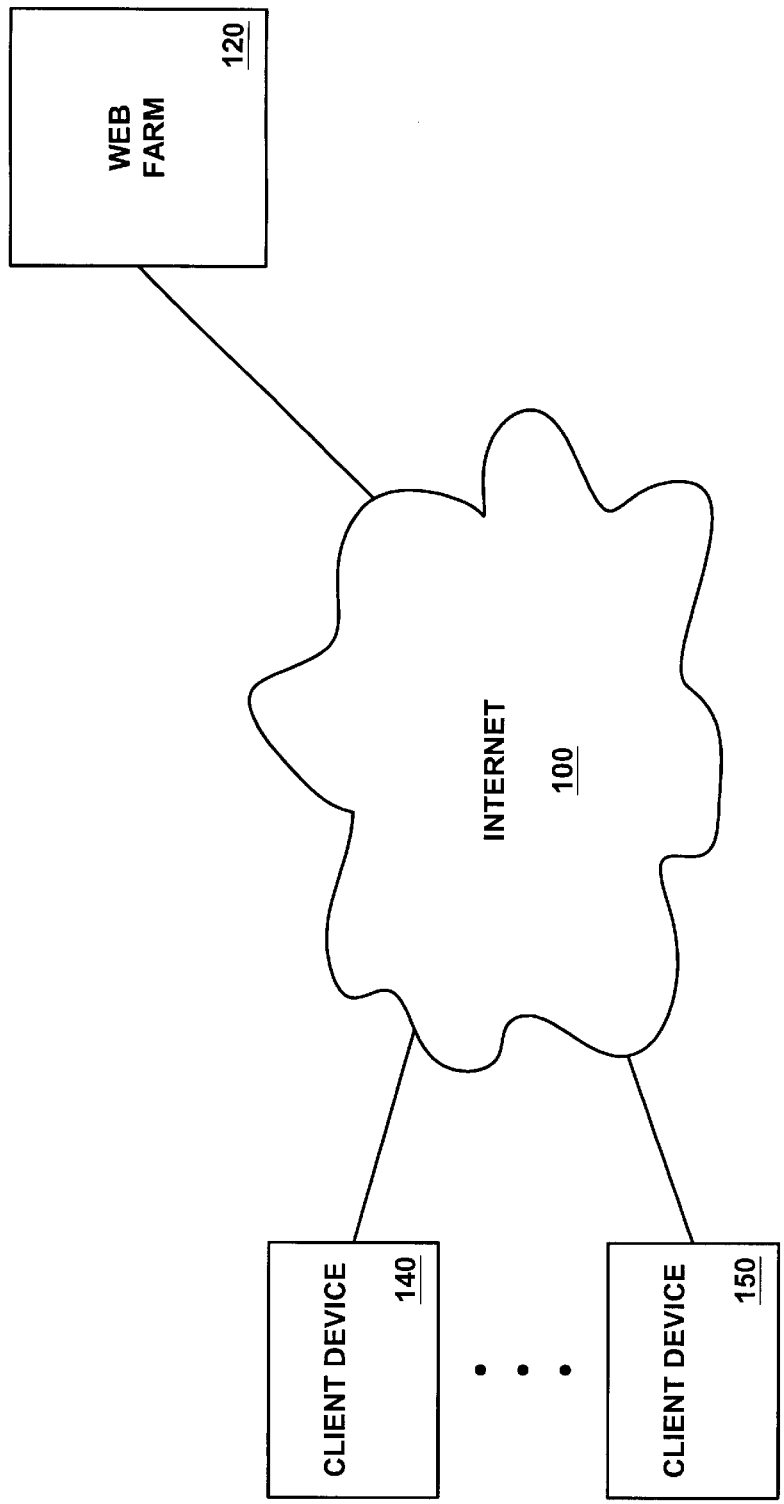
FIG. 1 is one embodiment of a network configuration for providing electronic commerce.

FIG. 1 is one embodiment of a network configuration for providing electronic commerce. Internet 100 provides a global interconnection of computing devices. The configuration of FIG. 1 illustrates the Internet as an interconnection medium between various parties; however, any network configuration (e.g., local area network, wide area network, metropolitan area network, Internet, intranet), whether wired or wireless, can be used. Also, any appropriate networking protocol can be used.

Client device 140 and client device 150 represent devices used to access networked resources for a user of the respective client devices. Any number of client devices can be coupled to Internet 100. In one embodiment, client devices 140 and 150 are computer systems; however, other devices can also be used. For example, client devices 140 and/or 150 can be "set-top boxes" or "Internet terminals" such as a WebTV™ terminal available from Sony Electronics, Inc. of Park Ridge, N.J., or a set-top box using a cable modem to access a network such as the Internet.

Alternatively, client devices 140 and/or 150 can be "dumb" terminals or thin client devices such as the Thin-STAR™ available from Network Computing Devices, Inc. of Mountain View, California. In another alternative embodiment, client devices 140 and/or 150 can be hand-held electronic devices, for example, personal digital assistants (PDAs), cellular telephones, pagers, or other electronic systems that provide network access.

Web farm 120 represents any configuration of servers that provide access to electronic resources such as, for example, Web pages and databases. In one embodiment, Web farm 120 includes multiple Hypertext Markup Language (HTML) servers that provide electronic commerce Web pages to client devices 140 and/or 150. Any configuration that provides access to electronic resources using any appropriate protocol can be used.

Figure 2:
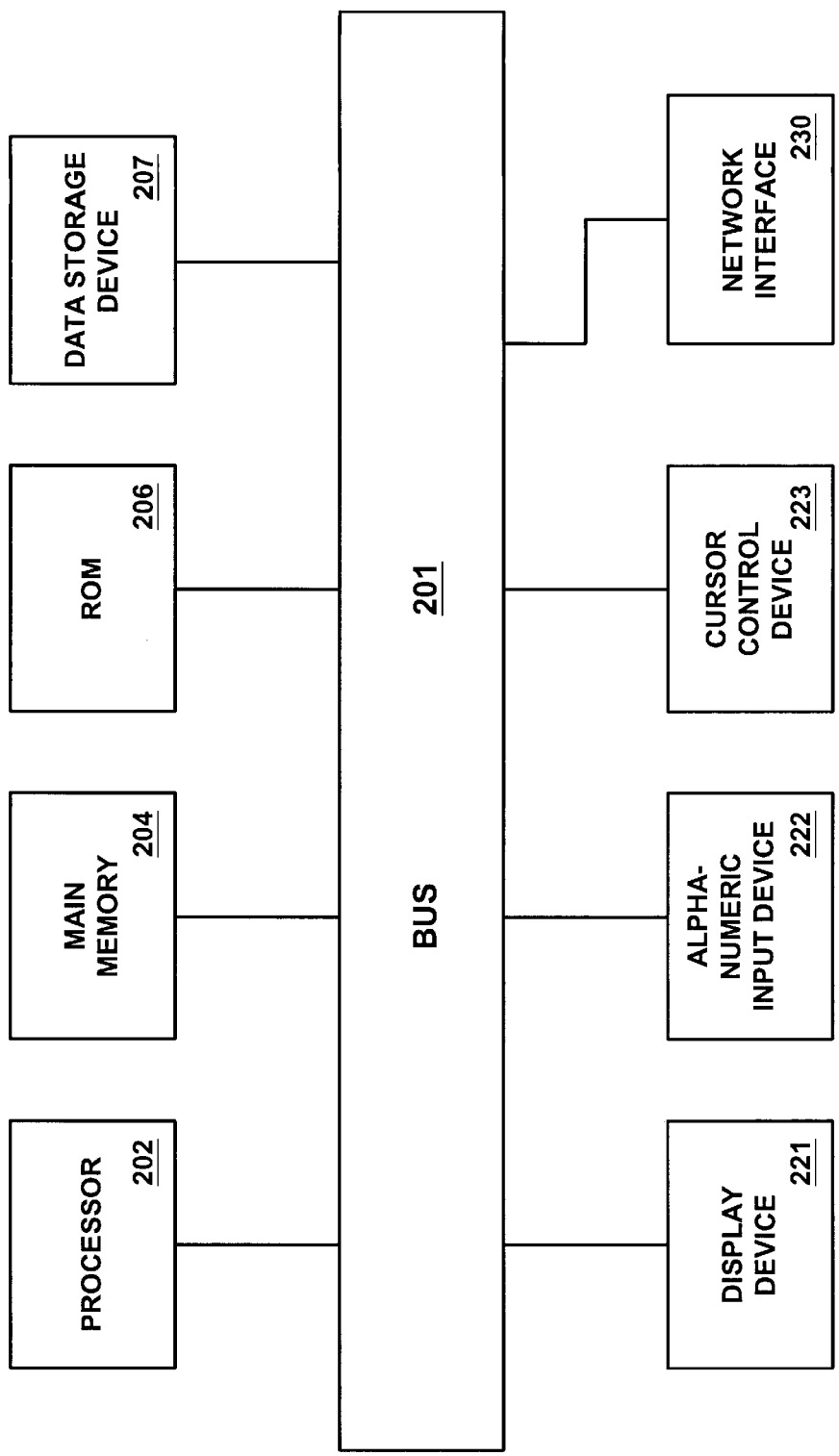
FIG. 2 is one embodiment of a computer system suitable for use with electronic commerce.

FIG. 2 is one embodiment of a computer system suitable for use with the invention. The computer system illustrated in FIG. 2 is intended to represent a range of electronic systems, for example, computer systems. Alternative electronic systems can include more, fewer and/or different components.

Computer system 200 includes bus 201 or other communication device to communicate information, and processor 202 coupled to bus 201 to process information. While computer system 200 is illustrated with a single processor, computer system 200 can include multiple processors and/or co-processors. Computer system 200 further includes random access memory (RAM) or other dynamic storage device 204 (referred to as main memory), coupled to bus 201 to store information and instructions to be executed by processor 202. Main memory 204 also can be used to store temporary variables or other intermediate information during execution of instructions by processor 202.

Computer system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to computer system 200.

Computer system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221.

Network interface 230 provides an interface between computer system 200 and an external network (not shown in FIG. 2). Network interface 230 can be, for example, a network interface card (NIC) or any other type of network interface capable of providing network access to computer system 200.

Instructions are provided to main memory 204 from a storage device, such as magnetic disk, a read-only memory (ROM) integrated circuit (IC), CD-ROM, DVD, via a remote connection (e.g., over a network), etc. In alternative embodiments, hard-wired circuitry can be used in place of or in combination with software instructions to provide on-line prescription ordering.

Figure 3:
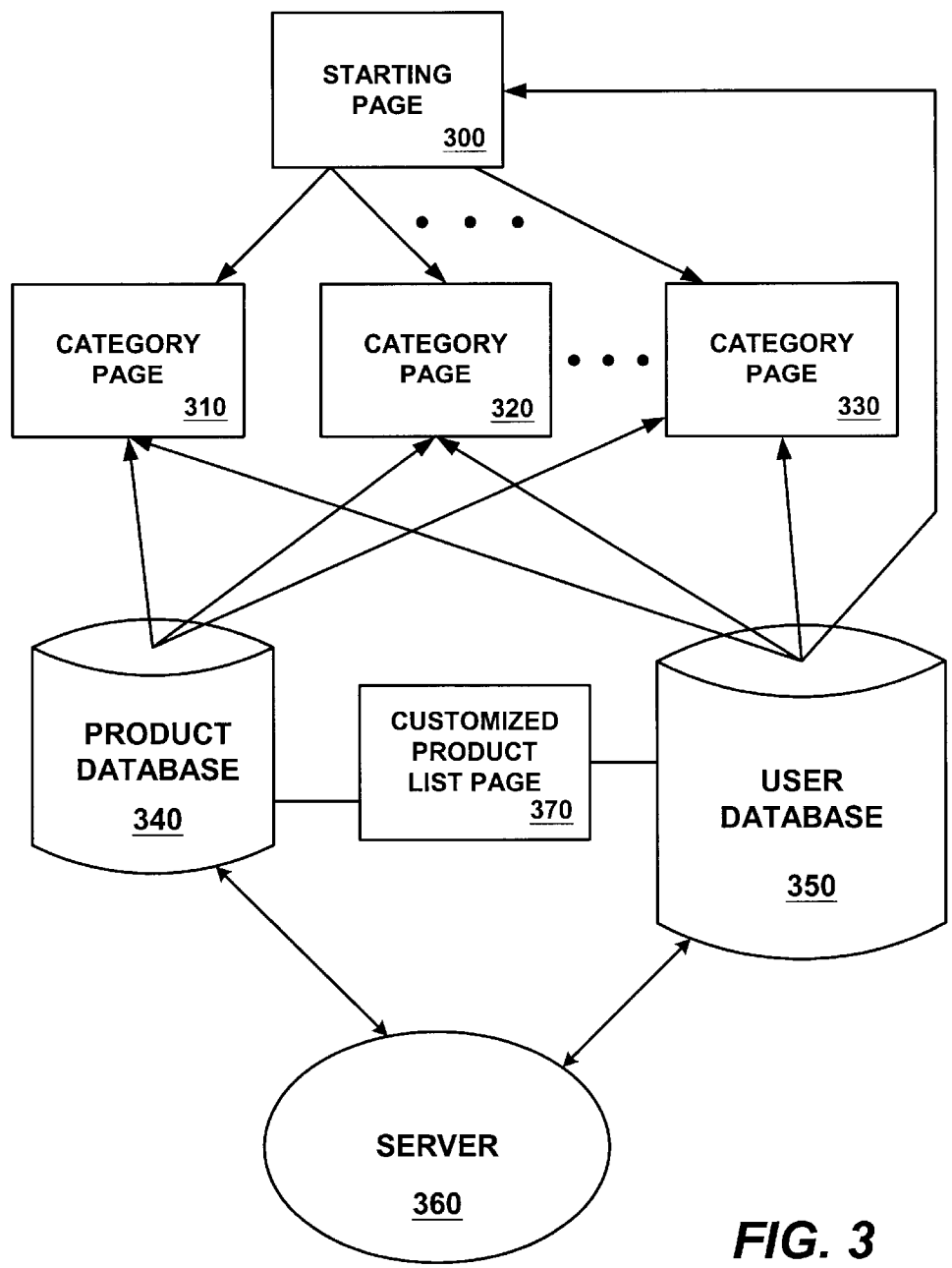
FIG. 3 illustrates one embodiment of a configuration for providing a set of World Wide Web electronic commerce pages.

FIG. 3 illustrates one embodiment of a configuration for providing a set of World Wide Web electronic commerce pages. Starting page 300 provides a starting page for users of an electronic commerce site. Starting page 300 can be different for different users, to provide a more customized experience for the user, or starting page 300 can be the same for all users. In one embodiment, starting page 300 is a Hypertext Markup Language (HTML) document; however, any appropriate programming language can be used.

Starting page 300 can receive user information from user database 350. In one embodiment, user database 350 stores information (e.g., name, address, preference information, previous order information) related to users of the electronic commerce site. User information can be retrieved from user database 350 based on, for example, using a "cookie" stored on the user's computer system to identify which user to retrieve information for, or alternatively, based on a login procedure.

In general, a cookie is information that a Web server stores on a client device to provide information to the server at a later time. A cookie can, for example, provide identification information, preferences, or similar information to the server when the client device subsequently contacts the server. The cookie can be used to identify a user and the corresponding information can be retrieved from user database 350 and used without requiring the user to enter information that had previously been provided.

From starting page 300, a user can navigate to one of several category pages (e.g., 310, 320, 330). In one embodiment, the category pages provide information (e.g., photographs, prices, manufacturer) related to various products offered for sale through the electronic commerce site. In one embodiment, product information is provided in response to user requests by product database 340, which can be implemented in any manner known in the art. Also, although not shown in FIG. 3, product database 340 can also provide information to starting page 300.

Category pages are not required; however, some organization of information that a user can navigate may provide a better experience for the user. Starting page 300 can also provide links to multiple related Web pages, rather than categories. For example, starting page 300 can operate as an electronic commerce "mall" and provide links to more specific electronic commerce sites (e.g., clothing, jewelry, electronics).

In one embodiment, customized product list page 370 is compiled from product database 340 and user database 350 for each user that accesses starting page 300. Customized product list page 370 includes information related to previous purchases. For example, customized product list page 370 can list all products previously purchased by a particular user, either in a categorized (e.g., by product category, by date, by price) format or an uncategorized format. Customized product list page 370 can also include additional information such as, for example, products the user intends to purchase in the future, or products that the user wishes to research. A customized product listing can also be provided to the user in a different format, for example, the listing can be in the form of a menu or any other format.

Server 360 operates in conjunction with product database 340 and user database 350 to provide starting page 300 and multiple category pages with product information and user information as described above.

Figure 4:
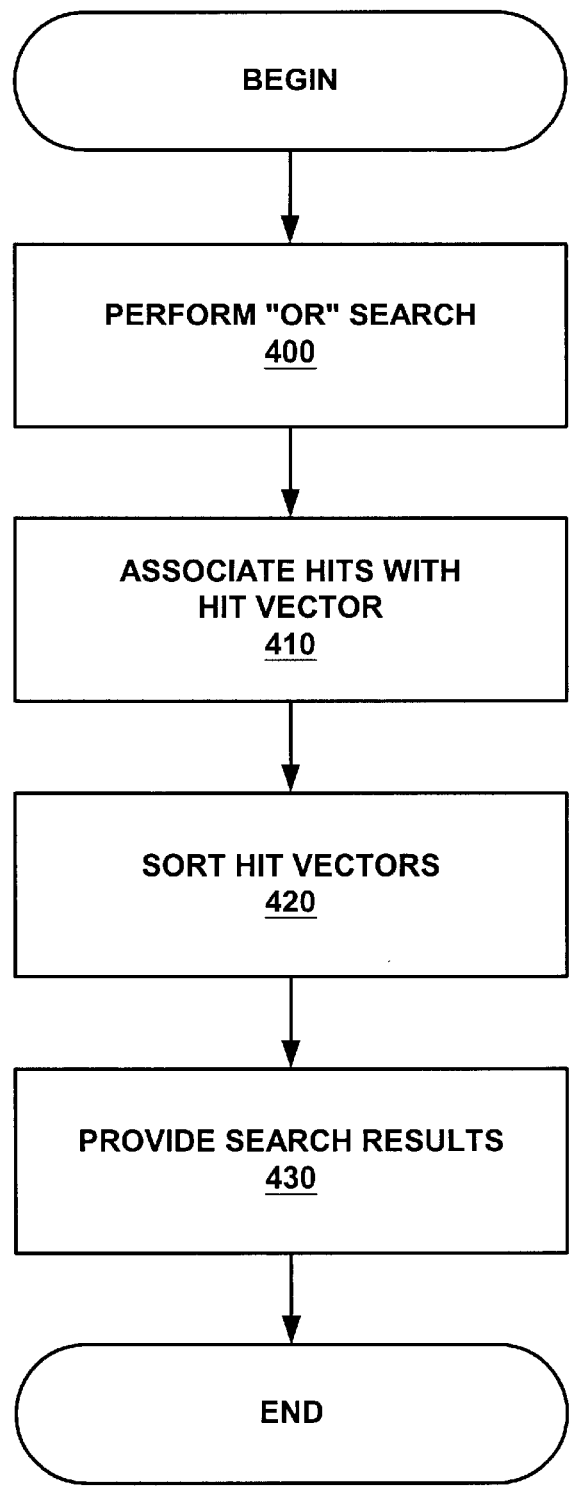
FIG. 4 is an overview flowchart for providing search results using a hit vector.

FIG. 4 is an overview flowchart for providing search hits using a hit vector. The search string of "Acme Mint Mouthwash" is used to illustrate a search technique; however, the search terms are not intended to limit the search technique described.

An OR search is performed at 400. In one embodiment, stemming is provided for the search. A search that includes "stemming" allows longer words to be considered matches. For example, for a search string of "pain*", with stemming both "pain" and "painful" would be considered matches. For an OR search with stemming, the search string "Acme Mint Mouthwash" becomes "Acme* OR Mint* OR Mouthwash*".

An OR search can be performed in any manner known in the art. For example, Index Server available from Microsoft Corporation of Redmond, Washington can be used as a search engine. Other search engines, searches other than an OR search, or other search techniques can also be used. The OR search result provides a set of all possible matches for a search string.

A hit vector is generated as a result of the OR search. In one embodiment, the hit vector contains bits to represent the "search terms" (i.e., words other than Boolean operators such as "AND" or "OR") in the search string. In one embodiment, searches are limited to eight search terms, which results in an 8-bit hit vector; however, any number of search terms can be used in association with the search technique described herein.

In one embodiment, if the search hit contains a search term (or a form of the search term) in the search string, the bit representing the search term or any form thereof is set to "1," while the bit is set to "0" if the search hit does not contain any form of the search term. As a result, a hit vector with each bit that represents a search term set to either "1" or "0" indicates exactly which search terms in the search string are contained in the search hit. In one embodiment, the last search term in a search request is represented by the lowest order bit. Thus, a search request with one search term has the search term represented by the lowest order bit, a search request with two search terms has the search terms represented by the two lowest order bits, etc. However, the first search term in a search string could be represented by the highest order bit in a hit vector.

The search string "Acme Mint Mouthwash," for example, contains three search terms. If a search is limited to eight search terms, an 8-bit hit vector is generated for each search hit. If the last search term is represented by the lowest order bit, then with "Acme Mint Mouthwash," only the three lowest order bits would represent the three search terms in the search string, to indicate which of the search terms are contained in la search hit. Specifically, starting from the left, the first five bits are set to "0," the sixth bit represents the search term "Acme," the seventh bit represents the search term "Mint," and the eighth (or lowest order) bit represents the search term "Mouthwash." The following table illustrates a search sub-string and hit vector relationship for the search string "Acme Mint lo Mouthwash:"

| Search sub-string | Hit Vector | Decimal Equivalent |
| --- | --- | --- |
| Acme Mint Mouthwash | 0, 0, 0, 0, 0, 1, 1, 1 | 7 |
| Acme Mint | 0, 0, 0, 0, 0, 1, 1, 0 | 6 |
| Acme Mouthwash | 0, 0, 0, 0, 0, 1, 0, 1 | 5 |
| Mint Mouthwash | 0, 0, 0, 0, 0, 0, 1, 1 | 3 |
| Acme | 0, 0, 0, 0, 0, 1, 0, 0 | 4 |
| Mint | 0, 0, 0, 0, 0, 0, 1, 0 | 2 |
| Mouthwash | 0, 0, 0, 0, 0, 0, 0, 1 | 1 |

A hit vector of "0, 0, 0, 0, 0, 1, 1, 1" indicates an exact match for all three 'search terms in the search string. A hit vector of "0, 0, 0, 0, 0, 1, 1, 0" indicates a match of the search terms "Acme" and "Mint," while the hit vector "0, 0, 0, 0, 0, 0, 1, 1" indicates a match of the search terms "Mint" and "Mouthwash."

Search hits are grouped with the corresponding hit vector at 410. By grouping the search hits with the corresponding hit vector, the number of search hits for each sub-string can be identified. At 420, hit vectors are sorted, and all matches with the same hit vector are grouped together. In one embodiment, hit vectors are sorted in descending order of the decimal equivalent of the hit vector. For example, a search for Acme Mint Mouthwash could generate the following set of hit vectors, each corresponding to a specific number of matches:

| Search sub-string | Search hits | Hit Vector | Decimal Equivalent |
| --- | --- | --- | --- |
| Acme | 48 matches | 0, 0, 0, 0, 0, 1, 0, 0 | 4 |
| Mint | 168 matches | 0, 0, 0, 0, 0, 0, 1, 0 | 2 |
| Mouthwash | 44 matches | 0, 0, 0, 0, 0, 0, 0, 1 | 1 |
| Acme Mint | 18 matches | 0, 0, 0, 0, 0, 1, 1, 0 | 6 |
| Acme Mouthwash | 10 matches | 0, 0, 0, 0, 0, 1, 0, 1 | 5 |
| Mint Mouthwash | 14 matches | 0, 0, 0, 0, 0, 0, 1, 1 | 3 |

Sorting the hit vectors in descending order of the decimal equivalent of the hit vectors provides the following:

| Group | Search sub-string | Search hits | Hit Vector | Decimal Equivalent |
| --- | --- | --- | --- | --- |
| 1 | Acme Mint | 18 matches | 0, 0, 0, 0, 0, 1, 1, 0 | 6 |
| 2 | Acme Mouthwash | 10 matches | 0, 0, 0, 0, 0, 1, 0, 1 | 5 |
| 3 | Acme | 48 matches | 0, 0, 0, 0, 0, 1, 0, 0 | 4 |
| 4 | Mint Mouthwash | 14 matches | 0, 0, 0, 0, 0, 0, 1, 1 | 3 |
| 5 | Mint | 168 matches | 0, 0, 0, 0, 0, 0, 1, 0 | 2 |
| 6 | Mouthwash | 44 matches | 0, 0, 0, 0, 0, 0, 0, 1 | 1 |

Because hit vectors are treated as numbers, the largest possible number is the number that result if all bits corresponding to the search terms are set to "1." If the hit vector indicates that all such bits are set to "1," then there is an exact match of every search term in the search string. If hit vectors are sorted in descending order of the decimal equivalent of the hit vector, groups with hit vectors representing the closest match for the search string will always be listed first. For example, if the top hit vector were 0,0, 0, 0, 0, 1, 1, 1, this would indicate that each search term in a search string containing three search terms matched, since all three bits were set to "1."

Search results are provided at 430, for example, by displaying all search results simultaneously. For example, looking at the top hit vector, 0, 0, 0, 0, 0, 1,1, 1, 0 (group 1) in the Acme Mint Mouthwash example, only two bits are set to "1." This means that all of the search terms in the search string did not match. Since only the third and second bits from the right are set to "1," all the matches in group 1 got there because they contained the first and second search terms in the search string "Acme Mint Mouthwash." Thus, the sub-string result set is displayed, for example:

Acme Mint (18 matches)

Similarly, in the hit vector for group 4, the second and first bits from the right are set to "1." This means that all matches in group 4 got there because they contained the second and third search terms in the search string. Thus, the sub-string result set is displayed, for example:

Mint Mouthwash (14 matches)

FIG. 4 describes the invention in terms of a method. However, one should also understand it to represent a machine-accessible medium having recorded, encoded or otherwise represented thereon instructions, routines, operations, control codes, or the like, that when executed by or otherwise utilized by the machine, cause the machine to perform the method as described above or other embodiments thereof that are within the scope of this disclosure.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of electronic searching comprising:
   performing an OR search based on a search request having one or more search terms;
   generating a hit for each of one or more OR search results that match a corresponding search term;
   using the hits and combinations of the hits to generate a hit vector, wherein the hit vector includes one or more bits, each of the one or more bits respectively representing a search result for each of the one or more search terms;
   sorting the hit vectors; and
   providing search results based, at least in part, on the sorted hit vectors.

2. The method of claim 1, wherein performing the OR search further comprises stemming at least one of the one or more search terms.

3. The method of claim 1, wherein a logical value of one of a bit in the hit vector represents a hit and a logical value of zero of a bit in the hit vector represents a miss with respect to the search term represented by the respective bit.

4. The method of claim 1, wherein providing search results comprises:
   sorting the search results in a descending order according to values represented by the bits of the hit vector; and
   generating an indication of the descending order.

5. The method of claim 4, wherein sorting the search results comprises:
   determining a number of the one or more search terms that are included in each combination of the one or more search terms for which the search is performed; and
   sorting the search results based, at least in part, on the number of the, one or more search terms included in a corresponding combination of the one or more search terms.

6. The method of claim 4, further comprising:
   grouping the search results of the one or more terms having the same value represented by the bits of the hit vector; and
   displaying the number of search results corresponding to the hit vector representing the grouped search results.

7. The method of claim 4, wherein
   the hits of the one or more search terms are represented by the corresponding bits of the hit vector starting from the least significant bit of the hit vector.

8. The method of claim 7, wherein
   the hit vector includes a number of bits that is greater than or equals to the number of search terms, unused bits of the hit vector having a logical value of zero.

9. A machine-readable medium having stored thereon sequences of instructions that, when executed, cause one or more electronic systems to:
   perform an OR search based on a search request having one or more search terms;
   generate a hit for each of one or more OR search results that matches a corresponding search term;
   use the hits and combinations of the hits to generate a hit vector, wherein the hit vector includes one or more bits, each of the one or more bits respectively representing a search result for each of the one or more search term;
   sort the hit vectors; and
   provide search results based, at least in part, on the sorted hit vectors.

10. The machine-readable medium of claim 9, wherein the sequences of instructions that, when executed, cause one or more electronic systems to perform OR the search comprise sequences of instructions that, when executed, cause the one or more electronic systems to stem at least one of the one or more search terms.

11. The machine-readable medium of claim 9, wherein a logical value of one of a bit in the hit vector represents a hit and a logical value of zero of a bit in the hit vector represents a miss with respect to the search term represented by the respective bit.

12. The machine-readable medium of claim 9, wherein the sequences of instructions that cause the one or more electronic systems to provide search results comprise sequences of instructions that, when executed, cause the one or more electronic systems to:
   sort the search results in a descending order according to values represented by the bits of the hit vector; and
   generate an indication of the descending order.

13. The machine-readable medium of claim 12, wherein the sequences of instructions that cause the one or more electronic systems to sort the search results comprise sequences of instructions that, when executed, cause the one or more electronic systems to:
   determine a number of the one or more search terms that are included in each combination of the one or more search terms for which the search is performed; and
   sort the search results based, at least in part, on the number of the one or more search terms included in a corresponding combination of the, one or more search terms.

14. The machine-readable medium of claim 12, further comprising sequences of instructions that, when executed, cause the one or more electronic systems to
   group the search results of the one or more terms having the same value represented by the bits of the hit vector, and
   display the number of the search results corresponding to the hit vector representing the grouped search results.

15. The machine-readable medium of claim 12, wherein the hits of the one or more search terms are represented by the corresponding bits of the hit vector starting from the least significant bit of the hit vector.

16. The machine-readable medium of claim 15 wherein the hit vector includes a number of bits that is greater than or equals to the number of search terms, unused bits of the hit vector having a logical value of zero.

17. An apparatus comprising:
   a processor; and
   a memory coupled to the processor, the memory to store sequences of instructions that, when executed, cause one or more electronic systems to perform an OR search based on a search request having one or more search terms, generate a hit for each of one or more OR search results that matches a corresponding search term, use the hits and combinations of the hits to generate a hit vector, wherein the hit vector includes one or more bits, each of the one or more bits respectively representing a search result for each of the one or more search term, sort the hit vectors, and provide search results based, at least in part, on the sorted hit vectors.

18. The apparatus of claim 17 wherein the sequences of instructions that, when executed, cause one or more electronic systems to perform the OR search comprise sequences of instructions that, when executed, cause the one or more electronic systems to stem at least one of the one or more search terms.

19. The apparatus of claim 17, wherein a logical value of one of a bit in the hit vector represents a hit and a logical value of zero of a bit in the hit vector represents a miss with respect to the search term represented by the respective bit.

20. The apparatus of claim 17, wherein the sequences of instructions that cause the one or more electronic systems to provide search results comprise sequences of instructions that, when executed, cause the one or more electronic systems to sort the search results in a descending order according to values represented by the bits of the hit vector, and generate an indication of the descending order.

21. The apparatus of claim 20, wherein the sequences of instructions that cause the one or more electronic systems to sort the search results comprise sequences of instructions that, when executed, cause the one or more electronic systems to determine a number of the one or more search terms that are included in each combination of the one or more search terms for which the search is performed, and sort the search results based, at least in part, on the number of the one or more search terms included in a corresponding combination of the one or more search terms.

22. The apparatus of claim 20, further comprising sequences of instructions that, when executed, cause the one or more electronic systems to group the search results of the one or more terms having the same value represented by the bits of the hit vector, and display the number of the search results corresponding to the hit vector representing the grouped search results.

23. The apparatus of claim 20, wherein hits of the one or more search terms are represented by the corresponding bits of the hit vector starting from the least significant bit of the hit vector.

24. The apparatus of claim 23, wherein the hit vector includes a number of bits that is greater than or equals to the number of search terms, unused bits of the hit vector having a logical value of zero.

25. A computer data signal embodied in a data communications medium shared among a plurality of network devices comprising sequences of instructions that, when executed, cause one or more electronic systems to:

perform an OR search based on a search request having one or more search terms;

generate a hit for each of one or more OR search results that matches a corresponding search term;

use the hits and combinations of the hits to generate a hit vector, wherein the hit vector includes one or more bits, each of the one or more bits respectively representing a search result for each of the one or more search term;

sort the hit vectors; and provide search results based, at least in part, on the sorted hit vectors.

26. The computer data signal of claim 25, wherein the sequences of instructions that, when executed, cause one or more electronic systems to perform the OR search comprise sequences of instructions that, when executed, cause the one or more electronic systems to stem at least one of the one or more search terms.

27. The computer data signal of claim 25, wherein a logical value of one of a bit in the hit vector represents a hit and a logical value of zero of a bit in the hit vector represents a miss with respect to the search term represented by the respective bit.

28. The computer data signal of claim 25 wherein the sequences of instructions that cause the one or more electronic systems to provide search results comprise sequences of instructions that, when executed, cause the one or more electronic systems to:

sort the search results in a descending order according to values represented by the bits of the hit vector; and generate an indication of the descending order.

29. The computer data signal of claim 28 wherein the sequences of instructions that cause the one or more electronic systems to sort the search results comprise sequences of instructions that, when executed, cause the one or more electronic systems to:

determine a number of the one or more search terms that are included in each combination of the one or more search terms for which the search is performed; and sort the search results based, at least in part, on the number of the one or more search terms included in the corresponding combination of the one or more search terms.

30. The computer data signal of claim 28 further comprising sequences of instructions that, when executed, cause the one or more electronic systems to group the search results of the one or more terms having the same value represented by the bits of the hit vector, and display the number of the search results corresponding to the hit vector representing the grouped search results.

31. The computer data signal of claim 28 wherein the hits of the one or more search terms are represented by the corresponding bits of the hit vector starting from the least significant bit of the hit vector.

32. The computer data signal of claim 25 wherein the hit vector includes a number of bits that is greater than or equals to the number of search terms, unused bits of the hit vector having a logical value of zero.

* * * * *